INVENTORS.
James L. Lass
Dominic A. Venier
Wilfred T. Ross
BY
Samuel E. Turner

April 4, 1972  J. L. LASS ET AL  3,654,077

NUCLEAR REACTOR FUEL ELEMENT SPACER

Original Filed June 26, 1967  4 Sheets-Sheet 4

3,654,077
NUCLEAR REACTOR FUEL ELEMENT SPACER
James L. Lass, Wilfred T. Ross, and Dominic A. Venier, San Jose, Calif., assignors to General Electric Company, San Jose, Calif.
Continuation of application Ser. No. 648,752, June 26, 1967. This application Feb. 17, 1969, Ser. No. 802,326
Int. Cl. G21c 3/32
U.S. Cl. 176—78          21 Claims

ABSTRACT OF THE DISCLOSURE

This describes a spacer for resiliently retaining the elongated fuel rods of a nuclear reactor in spaced relation. The spacer comprises a peripheral support band and dividers therein forming an "egg-crate" configuration of fuel rod passages. A spring member extends into each fuel rod passage from a corner thereof. The spacer is designed to minimize the contact area of the fuel rod with the spacer, to minimize distortion and restriction of coolant flow and to minimize the amount of spacer and retainer spring material. One embodiment is especially designed for fabrication from low neutron absorption material, such as zirconium alloys and for the automated production thereof.

---

This application is a continuation of application Ser. No. 648,752, filed June 26, 1967 now abandoned.

BACKGROUND

The release of large amounts of energy through nuclear fission reactions is now quite well known. In general a fissionable atom such as $U^{233}$, $U^{235}$, $Pu^{239}$, or $Pu^{241}$ absorbs a neutron in its nucleus and undergoes a nuclear disintegration. This produces on the average two fission products of lower atomic weight and great kinetic energy, and several fission neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exist in the fuel to override the effects of the fission products and other neutron absorbers which also may be present.

In order to maintain such fission reactions at a rate sufficient to generate useful quantities of thermal energy, nuclear reactors are presently being designed, constructed, and operated in which the fissionable material (nuclear fuel) is contained in fuel elements which may have various shapes, such as plates, tubes or rods. For convenience these fuel elements will hereinafter be referred to as fuel rods. These fuel rods are usually provided on their external surfaces with a corrosion-resistant non-reactive cladding which contains no fissile or fertile material. The fuel rods are grouped together at fixed distances from each other in a coolant flow channel or region as a fuel assembly or bundle. A sufficient number of the fuel assemblies are arranged to form a nuclear reactor core capable of the self-sustained fission reaction referred to above.

A typical fuel assembly is formed, for example, by a 6 x 6 array of spaced fuel rods, the rods being several feet in length, on the order of one-half inch in diameter and spaced from each other by a fraction of an inch. To prevent such elongated rods from touching one another, through bowing and vibration during reactor operation, it is necessary to retain the rods in spaced relation by a plurality of fuel rod spacers positioned along the length of the fuel rods.

A variety of fuel rod spacers have been proposed and used. For example, a fuel rod spacer is shown by D. A. Venier and J. L. Lass in copending U.S. Patent application Ser. No. 482,792 filed Aug. 26, 1965, now Pat. No. 3,350,275 and assigned to the assignee of the present invention. The spacer therein shown comprises a peripheral member supporting a plurality of dividers and crimped wires arranged in an "egg-crate" configuration to form a plurality of fuel rod passages or cells. Spring members, supported by the dividers, extend into each fuel rod passage to provide resilient support for an inserted fuel rod and to restrain vibration.

Design considerations of such fuel rod spacers include the following: retention of rod-to-rod spacing; retention of the assembly shape; allowance for fuel rod thermal expansion; restriction of rod vibration; ease of assembly of the fuel rod assembly; minimization of reactor coolant flow distortion and restriction; minimization of parasitic neutron absorption; minimization of contact areas between the spacer and fuel rods; maintenance of structural integrity of spacer; and minimization of manufacturing cost including adaptation to automated production. Thus the need to provide such fuel rod spacers creates several significant problems.

Any material, in addition to the nuclear fuel, that must be used in the construction of the reactor core absorbs neutrons and thus reduces the reactivity (and hence the fuel economy). The amount of neutron absorption is a function of the amount of material and of its neutron absorption characteristic.

It is therefore an object of the invention to provide a fuel rod spacer which absorbs a minimum of neutrons by minimizing the amount of material in the spacer and by utilizing materials having minimum neutron absorption.

A fuel rod spacer in the coolant flow channel constitutes an impedance to the coolant flow. The resulting pressure drop must be overcome by greater coolant flow pumping power. The contact areas between the spacer and the fuel rods constitute thermal barriers to the transfer of heat from the fuel to the coolant. Also, a poorly designed spacer may cause voids and uneven coolant flow with resultant localized fuel rod "hot spots." Excessively high temperatures at these hot spots can cause accelerated corrosion and even melting of the fuel rod clad material.

It is thus another object of the invention to minimize the contact area between the spacer and fuel rods and to minimize uneven cooling.

As mentioned above, it is desirable to utilize a material of low neutron absorption in the fabrication of fuel rod spacers. For example, zirconium alloys have desirably low neutron cross-sections, the neutron cross section of zirconium alloys being in the order of one-fifteenth that of stainless steel. As is well-known zirconium alloys present fabrication difficulties. They must be welded in a protected inert atmosphere and such material tends to crack and split during stamping, bending and other forming operations. Prior fuel rod spacer designs are generally not adaptable to fabrication with zirconium alloy material.

It is therefore another object of the invention to utilize zirconium alloy materials in a fuel rod spacer.

Where welding is a part of the fabrication process, zirconium alloys must be welded in a protected, inert atmosphere. For this and other economic reasons it is desirable to provide a fuel rod spacer which is well adapted to automated fabrication.

It is found desirable to provide spring members in a fuel rod spacer for restraining the fuel rods from lateral vibration to prevent undue wearing of the fuel rod cladding against the sides of the fuel rod passages. Suitable spring materials have relatively high neutron absorption. For example, the neutron cross section of Inconel-x is about one and one-half that of stainless steel and over twenty times that of zirconium alloys.

It is therefore another object of the invention to minimize the amount of spring material in a fuel rod spacer.

Another object of the invention is to provide means for limiting vibrational displacement of the fuel rod and limiting the area of contact of the fuel rod with the spacer in the event of retainer spring failure.

SUMMARY

The foregoing and other objects of the invention are achieved by providing a fuel rod spacer comprising a peripheral band which supports an open lattice divider assembly forming a plurality of fuel rod passages. A four-sided, box-shaped spring assembly is supported at selected intersections of the dividers such that a resilient side or spring member of at least one of the spring assemblies extends into each of the fuel rod passages. This spring arrangement significantly reduces the required amount of spring material as compared to prior fuel rod spacer designs.

In a first embodiment of the invention the divider assembly is formed of a combination of skeletonized sheet metal dividers and divider wires to minimize the amount of spacer material.

In a second embodiment of the invention the divider assembly is formed of skeletonized sheet metal members, the spacer being adapted for fabrication from low neutron absorption material such as zirconium alloy and to automated production.

DRAWING

The invention is described more specifically hereinafter with reference to the accompanying drawing wherein.

Figure 5:
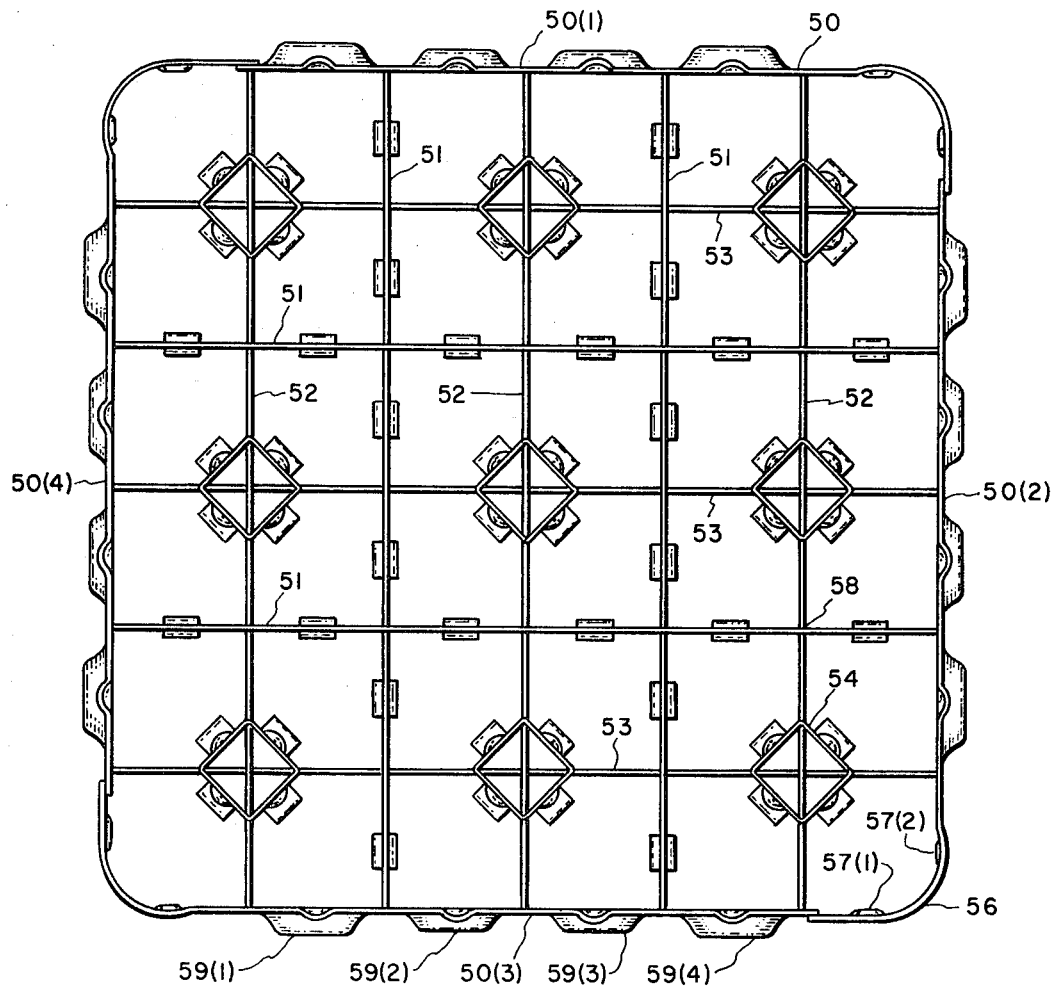
FIG. 5 is a perspective view of a second embodiment of a fuel rod spacer of the invention.
Figure 8:
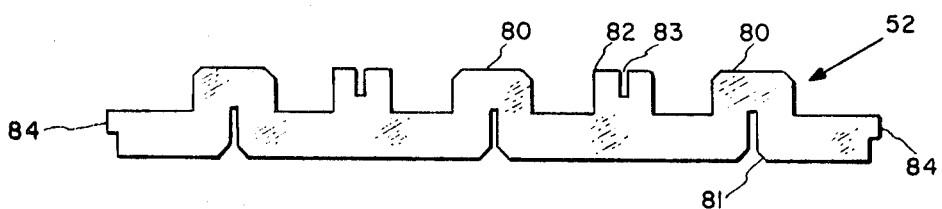
Figure 9:
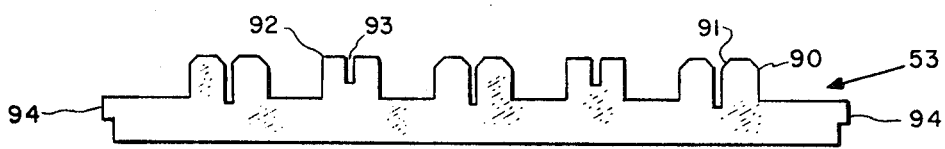
Figure 10:
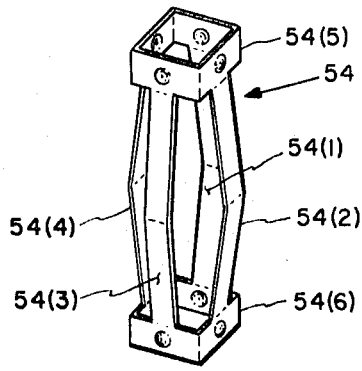

FIG. 7, Parts A and B are side end views, respectively of a divider member of the embodiment of FIG. 5;

FIG. 8 is a side view of a first type of divider of the embodiment of FIG. 5;

FIG. 9 is a side view of a second type of divider bar of the embodiment of FIG. 5; and FIG. 10 is an enlarged perspective view of a box-shaped spring as used in the fuel rod spacer of FIG. 5.

DESCRIPTION

Figure 1:
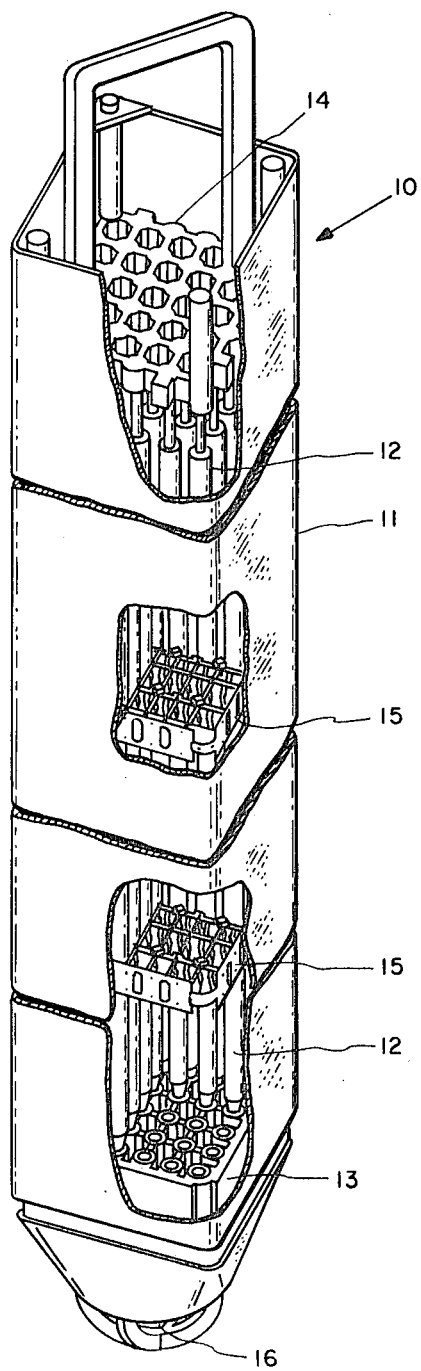
FIG. 1 is a perspective view, partly in section, of a fuel assembly incorporating fuel rod spacers.

Illustrated in FIG. 1 is a typical fuel assembly 10 comprising an open ended tubular flow channel 11 and a plurality of elongated fuel rods 12 supported between a lower tie plate 13 and an upper tie plate 14. The fuel rods 12 pass through a plurality of fuel rod spacers 15 which provide intermediate support to retain the elongated rods in spaced relation and restrain them from lateral vibration. A plurality of such fuel assemblies are arranged in a lattice to form a reactor core (not shown) wherein a lower opening 16 of each bundle communicates with a supply plenum containing a coolant, such as water, under pressure. The coolant thus flows through opening 16 and upward past the fuel rods 12.

Figure 2:
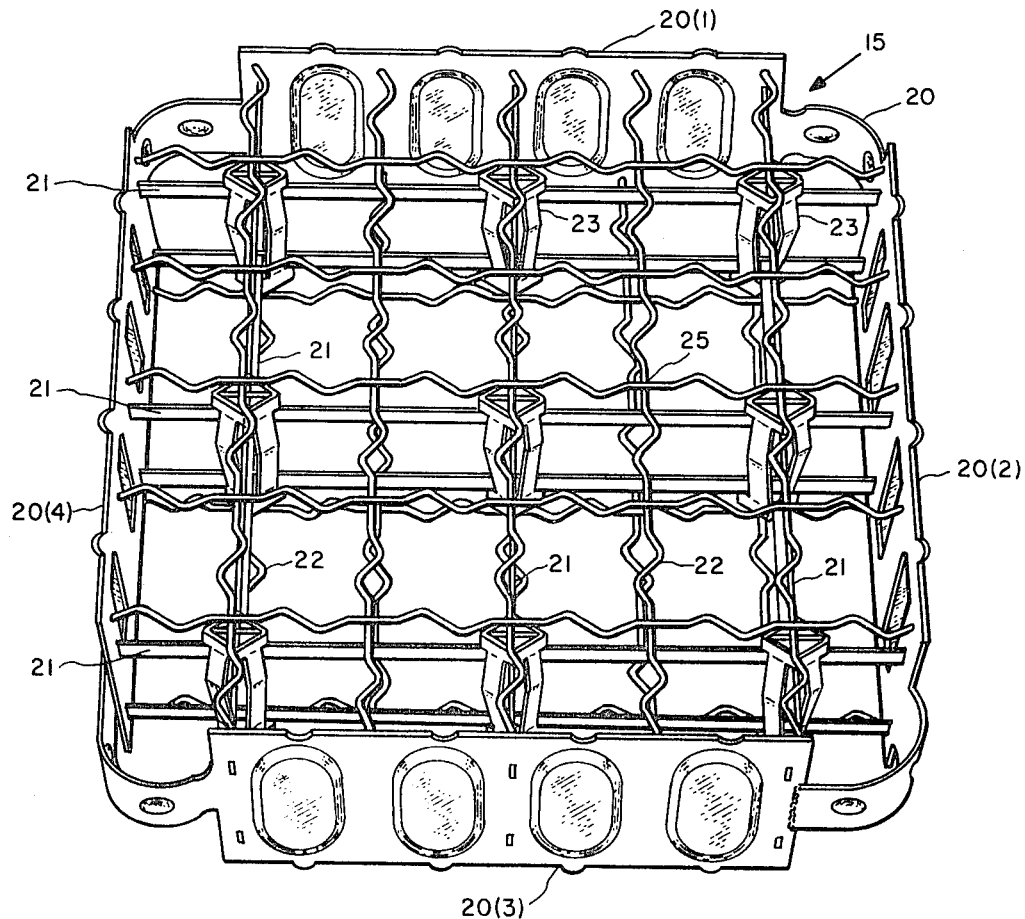
FIG. 2 is a perspective view of a first embodiment of a fuel rod spacer of the invention.

Illustrated in FIG. 2 is a first embodiment of a fuel rod spacer 15 formed of a peripheral support band 20, a plurality of sheet metal divider members 21 and a plurality of divider wires 22. The peripheral support band 20 includes a first pair of opposite sides 20(1) and 20(3) and a second pair of opposite sides 20(2) and 20(4). A first group of spaced divider members 21 is rigidly supported between sides 20(1) and 20(3) and a second group of spaced divider members 21 is rigidly supported between sides 20(2) and 20(4). The divider members of the first group thus intersect the divider members of the second group at approximately 90 degrees and the dividers are appropriately slotted to interlock at the intersections thereof. The divider wires 22 are arranged in vertically spaced pairs (each pair having an upper and and a lower wire) with a first group of such pairs supported between sides 20(1) and 20(3) and a second group of such pairs supported between sides 20(2) and 20(4). This "egg-crate like" arrangement of divider members 21 and divider wires 22 thus provides a plurality of cubicles or fuel rod passages.

As shown in FIG. 2, each of the divider wires 22 is crimped along its length to form a series of S-shaped curves. These S-shaped curves of the divider wires 22 are centered along the sides of the fuel rod passages, they provide resiliency in the divider wires and they limit the area of contact of the fuel rods with the divider wires. For greater rigidity, the crossing wires are preferably welded at the intersections thereof as at 25.

Figure 3:
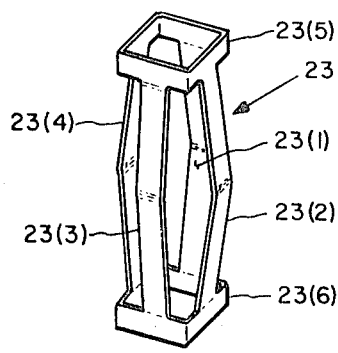
FIG. 3 is an enlarged perspective view of a box-shaped spring as used in the fuel rod spacer of FIG. 2.

Supported at each intersection of the divider members 21 is a four-sided spring assembly 23, an enlarged perspective view of which is shown in FIG. 3. The spring assembly 23 is formed of suitable spring material such as Inconel-x. The spring assembly is slotted along each corner thereof and each side is curved outwardly to form four outwardly extending spring members 23(1)–23(4) supported between upper and lower end portions 23(5) and 23(6). As assembled in the spacer of FIG. 2, the intersecting divider members 21 pass through the corner slots of the spring assembly 23 and a resilient side or spring member of the spring assembly extends in a diagonal direction into each of the cubicles or fuel rod passages to resiliently restrain the fuel rods.

Figure 4:
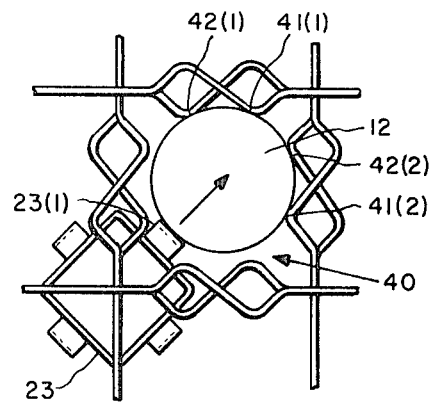
FIG. 4 is a top view of a portion of the fuel rod spacer of FIG. 2 illustrating the operation and advantages of the spring arrangement of the invention.

The advantages of the spring arrangement of the invention are more apparent from FIG. 4 which illustrates a fuel rod 12 in fuel rod passage 40 of the fuel rod spacer of FIG. 2. The spring member 23(1) of spring assembly 23 exerts a lateral force on the fuel rod 12 along a diagonal of the fuel rod passage 40 in the direction indicated by the arrow. This forces the fuel rod 40 into contact with the S-curves of the upper divider wires at points 41(1) and 41(2) and with the S-curves of the lower divider wires at points 42(1) and 42(2). In this manner the fuel rod 12 is restrained from movement in any lateral direction with only one spring member. This arrangement requires only about one-half the amount of spring material required in prior fuel rod spacers, for example, such as shown in the previously mentioned patent application Ser. No. 482,792 wherein the springs exert a force from side to side in the fuel rod passage whereby two springs in each fuel rod passage are required. Since suitable spring materials have relatively high neutron absorption, the spring arrangement of the invention provides a significant improvement in neutron economy. Furthermore, the number of contact areas of the fuel rods with the spacer is reduced.

Figure 6:
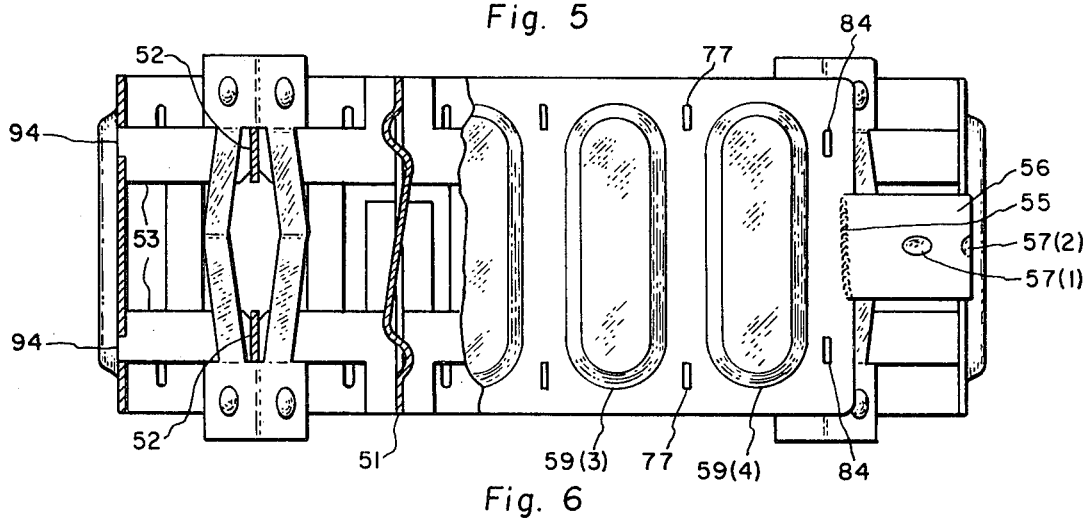
FIG. 6 is an elevation view partly in section of the fuel rod spacer of FIG. 5.

Illustrated in FIGS. 5 and 6 is a second embodiment of a fuel rod spacer. This spacer is formed of a peripheral support band 50, a plurality of sheet metal divider members 51 and a plurality of sheet metal divider bars 52 and 53. The peripheral support band 50 includes a first pair of opposite sides 50(1) and 50(3) and a second pair of opposite sides 50(2) and 50(4). A first group of spaced divider members 51 is rigidly supported between sides 50(1) and 50(3) and a second group of spaced divider members 51 is rigidly supported between sides 50(2) and 50(4).

The divider bars are arranged in vertically spaced pairs, each pair including an upper and a lower bar, with a first group of pairs of divider bars 52 supported between sides 50(1) and 50(3) and a second group of pairs of divider bars 53 supported between sides 50(2) and 50(4), the group of pairs of divider bars 53 supported between sides 50(2) and 50(4), the pairs of divider bars being arranged in alternate laterally spaced relation to the divider members 51. The thus intersecting divider members and bars are appropriately slotted to interlock at the intersections thereof. This "egg-crate like" arrangement of intersecting divider members and bars thus provides a plurality of cubicles or fuel rod passages. The divider members and divider bars are preferably welded at the intersections thereof, as at 58, for increased rigidity of the spacer.

Each side 50(1)–50(4) of the peripheral support band 50 includes a lateral extension which forms a curved corner band, the end of each corner band being welded to the edge of the adjacent side members as by a weld 55. For example, the side 50(2) includes a corner band 56. The corner bands may be of reduced height as shown to reduce the amount of spacer material and to enhance coolant flow past the corner fuel rods without undue sacrifice in the rigidity of the spacer. Each corner band 56 is formed with a pair of laterally elongated indentations 57(1) and 57(2) to limit contact area with the corner fuel rods.

Each side member is formed with a plurality of outwardly extending lobes 59(1)–59(4) one adjacent the side of each of the side fuel rod passages. These lobes allow the flow of coolant around the side fuel rods and limit the contact area of these fuel rods with the side members. The peripheral edges of these lobes are curved and sloped to prevent the formation of coolant vapor pockets. When the spacer is fabricated from the preferred zirconium alloy material, the radius of curvature of formed sections must be a minimum of about three times the material thickness to prevent cracking of the material.

Figures 7A, 7B:
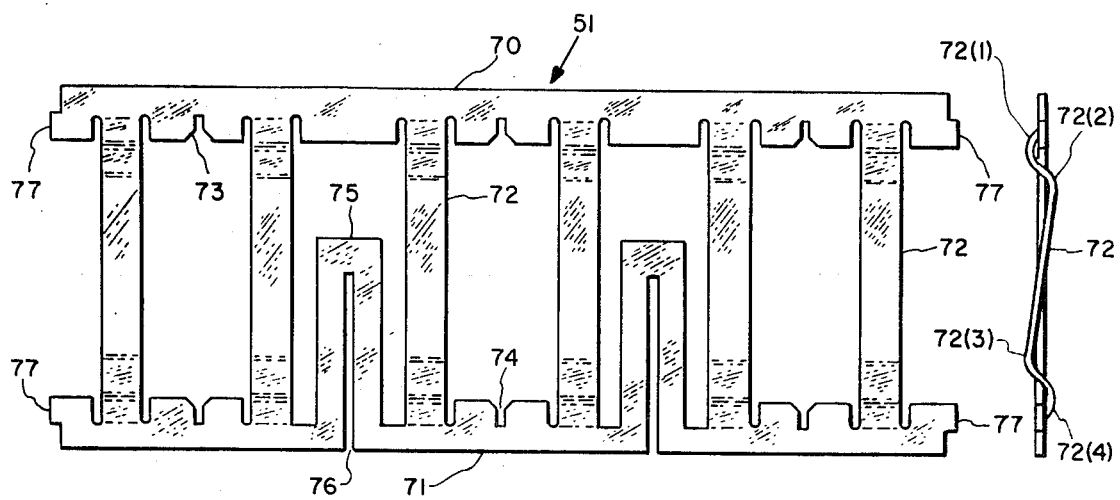

Details of the divider members 51 are shown in FIGS. 7A and 7B. A typical divider member 51, shown in elevation view in FIG. 7A, is integrally formed, by punching or the like, to provide an upper lateral portion 70 and a lower lateral portion 71 interconnected by a plurality of vertical segments 72. The vertical segments 72 are positioned and spaced such that, in the assembled spacer, they are centered along the sides of the fuel rod passages as shown in FIG. 6. As shown in end view in FIG. 7B, each vertical segment 72 is crimped in the form of a double S-curve which provides relatively rigid projections 72(1)–72(4) for engagement with and lateral location of the fuel rods. The fuel rods thus contact the divider members 51 only at points 72(1)–72(4) of vertical segment 72 to thus limit the contact area of the fuel rod with the divider members.

Upper and lower portions 70 and 71 (FIG. 7A) are formed with a plurality of spaced slots, such as slots 73 and 74, to provide interlocking with intersecting divider bars 52 and 53. Lower portion 71 is formed with a plurality of spaced vertical extensions, such as an extension 75, each formed with a slot 76 to provide interlocking with inverted intersecting divider members. In other words, as shown in FIG. 5, the slot 76 of the first group of divider members 51 (extending between support band sides 50(1) and 50(3)) open downwardly while the second group of divider members 51 (extending between support member sides 50(2) and 50(4)) are inverted so that the slots 76 thereof open upwardly to interlock with the slots 76 of the first group.

As shown in FIG. 7A, extensions 77 are formed at the outer ends of the upper and lower portions 70 and 71 of the divider members 51. As shown in FIG. 5, the extensions 77 fit into appropriate slots in the support band 50 wherein they are secured by welding or the like.

A typical divider bar 52 is shown in FIG. 8. The bar is formed from sheet metal, for example, by punching. A plurality of vertical extensions 80 are each formed with a slot 81 for interlocking with intersecting divider bars 53. A plurality of vertical extensions 52 are each formed with a slot 83 for interlocking with divider members 51. Lateral extensions 84 are formed at the outer ends of bar 52. As shown in FIG. 5, the extensions 84 fit into appropriate slots in the support band 50 wherein they are secured by welding or the like. As mentioned hereinbefore, the bars 52 are supported in vertically spaced pairs between sides 50(1) and 50(3) of peripheral support band 50. The upper bars of each pair are oriented such that the slots 81 open downwardly while the lower bars are inverted such that the slots 81 thereof open upwardly.

A typical divider bar 53 is shown in FIG. 9. A plurality of vertical extensions 90 are each formed with a slot 91 for interlocking with intersecting divider bars 52. A plurality of vertical extensions 92 are each formed with a slot 93 for interlocking with divider members 51. Lateral extensions 94 are formed at the outer ends of bar 53. These lateral extensions 94 fit appropriate slots in the peripheral support band 50 (FIG. 5) for support of bars 53 between the sides 50(2) and 50(4) in vertically spaced pairs, the upper bar of each pair being oriented so that the slots 91 and 93 thereof open upwardly and the lower bar being inverted with the slots thereof opening downwardly.

Supported at each intersection of the pairs of divider bars 52 and 53 (FIGS. 5 and 6) is a four-sided box spring assembly 54, an enlarged perspective view of which is shown in FIG. 10. The spring assembly 54 is formed of suitable spring material such as Inconel-x. The spring assembly is slotted along each corner thereof and each side is curved outwardly to form four outwardly extending spring members 54(1)–54(4) supported between upper and lower end portions 54(5) and 54(6). Each of the four sides of each of these end portions is formed with an outwardly extending hemispherical dentation the purpose of which is to limit contact area with and lateral movement of the adjacent fuel rod in the event of failure of a spring member. As assembled in the spacer of FIGS. 5 and 6, the intersecting pairs of divider bars 52 and 53 pass through the corner slots of the spring assembly 54 and, thus, a resilient side or spring member of the spring assembly extends, in a diagonal direction, into each of the cubicles or fuel rod passages to resiliently restrain the fuel rods and force them into engagement with the rigid projections 72(1)–72(4). With this arrangement, a fuel rod makes a maximum of five points of contact with the spacer.

The use of divider wires in the embodiment of FIG. 2 aids in reducing the amount of spacer material. However, it is found difficult to automate the fabrication of the embodiment of FIG. 2 because the wires tend to distort upon heating during welding. Through the use of interlocking sheet metal divider members and bars, the embodiment of FIGS. 5 and 6 is well adapted to automated fabrication. This is especially advantageous when zirconium alloys are employed since welding thereof must take place in a protected, inert atmosphere. The divider members 51, the divider bars 52 and 53, the box spring assemblies 54 and the sides 50(1)–50(4) of peripheral support band 50 may be assembled in and held by an appropriate fixture. The fixture supported spacer may then be placed in a sealed enclosure containing an appropriate inert atmosphere, such as helium or argon, wherein the required welds can be made automatically by appropriate welding apparatus (not shown).

Thus what has been described is a spacer for resiliently supporting fuel rods in a bundle with minimized neutron absorption and with minimum contact area of the fuel rods with the spacer.

While illustrative embodiments of the invention have been described herein, modifications and adaptations thereof may be made by those skilled in the art without departure from the spirit and scope of the invention as defined by the following claims:

What is claimed is:

1. In a fuel bundle for a nuclear reactor including at least four elongated elements, a spacer for said elements comprising: a structure forming adjacent respective passages for said elements, said passages being of substantially square cross section; a spring assembly formed separate from said structure providing laterally extending spring members, a respective one of said spring members extending into each of said element passages from a corner thereof to engage the respective element extending therethrough, and a respective pair of laterally spaced substantially rigid members in each of said passages for engaging the respective element in reaction to the force of the respective spring member.

2. The spacer of claim 1 wherein the material forming said structure has a lower neutron capture cross section than the material forming said spring members.

3. The spacer of claim 1 wherein each of said spring members is longitudinally elongated and deformed at its central portion to make contact of limited area with an element, said deformed portion being curved with an axis of curvature substantially perpendicular to the axis of said element.

4. The spacer of claim 1 further including an additional pair of laterally spaced substantially rigid members in each of said passages, said first mentioned pair and said additional pair being longitudinally spaced and positioned such that the respective spring member exerts its force against the respective element in a direction longitudinally and laterally intermediate said rigid members.

5. The spacer of claim 4 wherein portions of said dividers are deformed into said passages to provide said rigid members.

6. In a fuel bundle for a nuclear reactor including a plurality of elongated elements, a spacer for said elements comprising: a structure forming respective passages for said elements, said passages being of substantially square cross section; at least a pair of laterally spaced substantially rigid means in each of at least some of said passages, said rigid means including a first rigid member extending into each respective passage from one side thereof and a second rigid member extending into said respective passage from a side adjacent said one side, and substantially resilient means in each of said some of said passages for exerting a force against said elements extending through said some of said passages in a lateral direction intermediate said pair of laterally spaced rigid means, said resilient means comprising a resilient member extending into said passage from the corner of the respective passage opposite the included corner between said adjacent sides.

7. The spacer of claim 6 wherein at least two longitudinally spaced substantially rigid members extend into said respective passage from each of said adjacent sides.

8. The spacer of claim 6 wherein said passages are formed by intersecting dividers and wherein said resilient means comprises a plurality of four-sided spring assemblies supported at predetermined intersections of said dividers such that one side of one of said spring assemblies extends into each of said passages.

9. The spacer of claim 8 wherein said dividers are deformed to provide vertically spaced curved portions extending into said passages to provide said rigid means.

10. The spacer of claim 8 wherein said dividers are skeletonized to provide neutron and coolant flow passages therethrough.

11. The spacer of claim 8 wherein said spring assemblies are formed separate from said dividers and wherein said dividers are formed of a material having a lower neutron capture cross section than the material forming said spring assemblies.

12. The spacer of claim 11 wherein said intersecting dividers are supported by a peripheral support band formed by four sides interconnected by curved corner bands having a height less than the height of said side sections.

13. The spacer of claim 12 wherein said side sections are formed with an outwardly extending lobe along the side of each adjacent element passage to limit contact area between said side sections and said elements and to provide coolant flow around said elements, wherein said structure is formed of a material containing a substantial amount of zirconium and wherein said lobes are oblong in form with rounded and tapered peripheral edges with radii of curvature of not less than three times the thickness of said side sections.

14. In a fuel bundle for a nuclear reactor including a plurality of elongated elements, a spacer for said elements, comprising: a structure of intersecting dividers forming passages for said elements, said passages being of substantially square cross section; at leat two rigid projections extending into each of at least some of said passages for engaging and laterally locating the respective elements extending through said passages, and resilient means in a corner of said passage providing a single resilient projection in each of said some of said passages for exerting a force in a direction intermediate said rigid projections for maintaining said respective elements in engagement with said rigid projections.

15. The spacer of claim 14 wherein said resilient means comprises a plurality of multi-sided spring assemblies supported at predetermined ones of said intersections of said dividers such that one side of one of said spring assemblies forms said single resilient projection in each of said some of said passages.

16. The spacer of claim 15 wherein said dividers are deformed to provide said rigid projections.

17. In a fuel bundle for a nuclear reactor including a plurality of elongated elements, a spacer for retaining said elements in lateral position comprising: a structure of intersecting members forming a plurality of element passages contiguous to each intersection of said members, said passages being of substantially square cross section; substantially rigid means in each of at least some of said passages for engaging and laterally locating said elements; and a resilient assembly positioned at the corners of said intersecting members, each said resilient assembly engaging the elements in each of the passages contiguous to the intersection at which said assembly is positioned for forcing said elements into engagement with said rigid means.

18. The spacer of claim 17 wherein each of said resilient assemblies is a spring assembly formed separate from said structure and providing laterally extending spring members, a respective one of said spring members extending into each of said element passages contiguous to the intersection at which said assembly is located.

19. The spacer of claim 18 wherein said spring members are connected between end members to form said spring assembly, said spring assembly being retained at its respective intersection by engagement of said end members with said intersecting members of said structure.

20. In a fuel bundle for a nuclear reactor including a plurality of elongated elements, a spacer for said elements comprising: a peripheral support band; a first group of substantially parallel divider wires connected between opposite sides of said support band, said wires being arranged in laterally spaced pairs, the wires of each pair being longitudinally spaced; a second group of substantially parallel divider wires connected between opposite sides of said support band, said wires being arranged in laterally spaced pairs, the wires of each pair being vertically spaced, the wires of said first group being positioned substantially perpendicular to the wires of said second group to form said respective element passages; and a plurality of four-sided spring assemblies positioned at predetermined ones of the intersections of said pairs of wires of said first and second groups of wires such that only one side of one of said spring assemblies extends into each of said some of said passages whereby said respective elements are forced into engagement with said wires.

21. The spacer of claim 20 wherein each of said wires is crimped along its length to provide an S-shaped curve therein along each side of each element passage.

References Cited

UNITED STATES PATENTS

| | | | |
|---|---|---|---|
| 3,182,003 | 5/1965 | Thorp et al. | 176—78 |
| 3,228,854 | 1/1966 | Bekkering et al. | 176—78 |
| 3,255,090 | 6/1966 | Leirrik | 176—76 |
| 3,255,091 | 6/1966 | Frisch | 176—76 X |
| 3,301,765 | 1/1967 | Frye et al. | 176—76 X |
| 3,314,860 | 4/1967 | Wilman | 176—78 |
| 3,350,275 | 10/1967 | Venier et al. | 176—76 X |
| 3,350,276 | 10/1967 | Warberg et al. | 176—76 X |
| 3,369,973 | 2/1968 | Voigt et al. | 176—78 |
| 3,379,617 | 4/1968 | Andrews et al. | 176—78 |
| 3,398,053 | 8/1968 | Huber et al. | 176—78 |

FOREIGN PATENTS

| | | | |
|---|---|---|---|
| 1,436,977 | 3/1966 | France | 176—78 |
| 969,131 | 9/1964 | Great Britain | 176—78 |
| 1,014,822 | 12/1965 | Great Britain | 176—76 |

CARL D. QUARFORTH, Primary Examiner

G. G. SOLYST, Assistant Examiner